(No Model.) 2 Sheets—Sheet 1.

H. KEISER.
Device for Cribbing and Conveying Corn.

No. 239,102. Patented March 22, 1881.

(No Model.) 2 Sheets—Sheet 2.

H. KEISER.
Device for Cribbing and Conveying Corn.

No. 239,102. Patented March 22, 1881.

Witnesses:
A. H. Krause
P. C. Dietrich

Inventor:
Henry Keiser
By DeWitt C. Allen
Atty.

UNITED STATES PATENT OFFICE.

HENRY KEISER, OF BLOOMINGTON, ILLINOIS.

DEVICE FOR CRIBBING AND CONVEYING CORN.

SPECIFICATION forming part of Letters Patent No. 239,102, dated March 22, 1881.

Application filed February 4, 1881. (No model.)

*To all whom it may concern:*

Be it known that I, HENRY KEISER, of Bloomington, in the county of McLean, and in the State of Illinois, have invented certain new and useful Improvements in Cribbing and Conveying Corn; and I do hereby declare that the following is a full, clear, and exact description thereof, reference being had to the accompanying drawings, and to the letters of reference marked thereon, making a part of this specification.

My invention relates to certain new and useful improvements in cribbing and conveying corn by machinery in connection with grain-elevators, whereby I am enabled to convey the corn to the cribs in elevator-building, and also from said cribs to a corn-sheller when desired for shelling; and to this end the invention consists in novel combinations and arrangement of parts, all as will be hereinafter fully described, and specifically pointed out in the claims.

To enable others skilled in the art to make and use my invention, I will now proceed to describe its construction and operation, referring to the accompanying drawings, in which—

Figure 1:
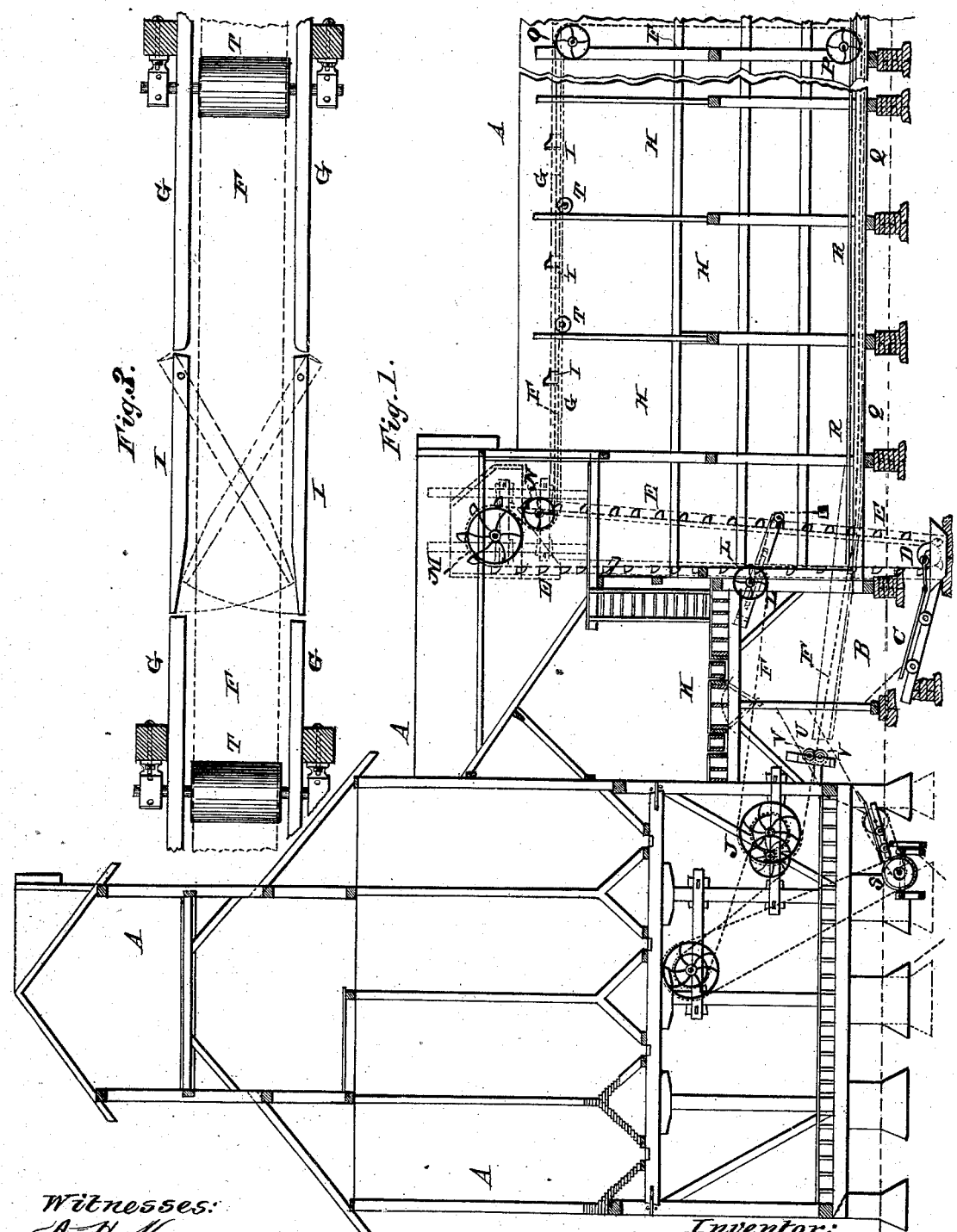
Figure 2:
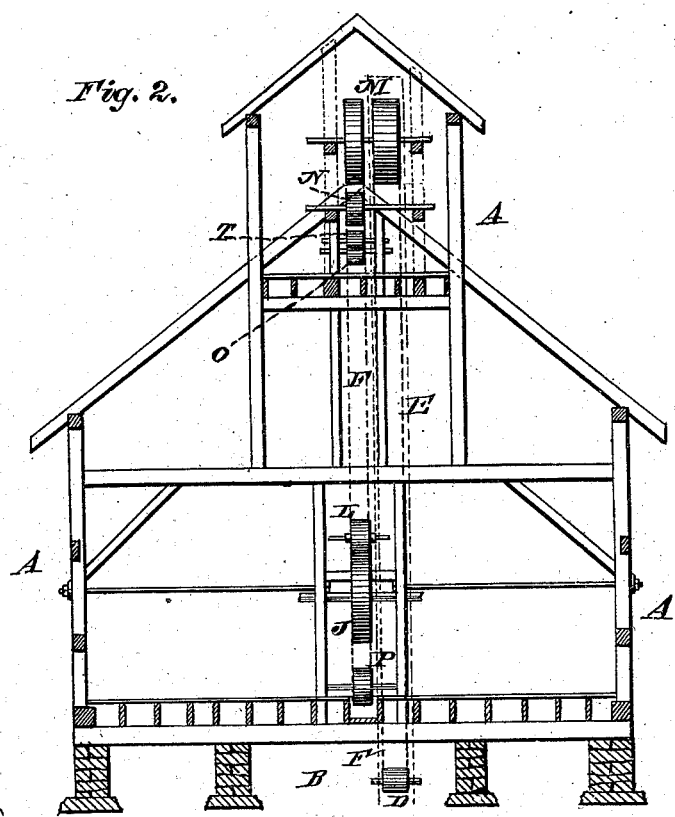
Figure 5:
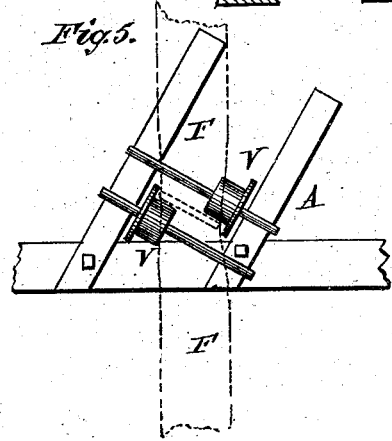
Figure 4:
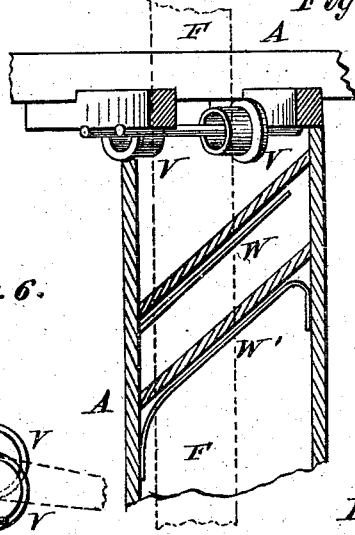
Figure 6:
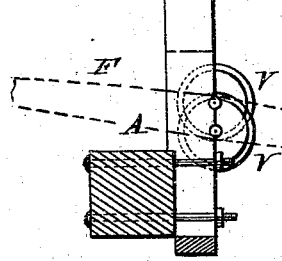

Figure 1 represents a vertical section of an elevator-building with my improvements as applied thereto; Fig. 2, an end elevation of the same. Fig. 3 represents a plan of the drag-box, through which passes the endless drag-belt; Fig. 4, a detail plan of tipping-rollers and scrapers or switches for discharging the corn from drag-belt into hopper or spout leading to corn-sheller; Fig. 5, detail end view of rollers for tipping drag-belt; Fig. 6, detail side view of tipping-rollers.

In the drawings, A represents an elevator-building, and B a sink-hopper, into which the corn to be cribbed is dumped, having in the bottom thereof a vibrating feed-shoe, C, operated through the medium of a crank from axle of pulley D in boot of elevator E. This vibrating shoe C feeds the corn into said elevator, which elevates and discharges it on an endless drag-belt, F, which carries it along in a suitable trough or drag-box, G, arranged in or over a series of cribs, H, from which it is discharged by means of the gates or switchboards I, and drops into the cribs. These gates or switch-bars are pivoted to or in the sides of drag-box at suitable intervals the entire length of the cribs, and so that they may be thrown across the upper surface of drag-belt, as shown in dotted lines, Fig. 3, and thus permit the corn to be discharged from either side of said belt into the cribs. This drag-belt is driven by a large pulley, J, in elevator-building, as shown in Figs. 1 and 2, and the upper side or portion thereof passes outward from said driving-pulley under dump-house floor K, and under a self-adjusting tightening-pulley, L, thence upward and over pulley M on elevator-shaft and down under pulley N, which is used to bring or hold the belt low enough to receive the corn discharged from elevator E. The belt then passes through the trough or drag-box G to the rear end of cribs H, over pulley O, and thence downward and under pulley P, into a drag-box or trough, Q, in the floor of a passage-way, R, extending the entire length of the cribs H, said passage-way R being made large enough to permit workmen to pass along for the purpose of opening gates arranged at suitable intervals in the cribs and feed the corn therefrom onto the drag-belt, which carries it to a certain point, from which it is discharged into a trough or hopper leading to corn-sheller S, arranged in basement of elevator-building. Both the upper and lower troughs or drag-boxes, G Q, are provided with transverse rollers T, which are elevated enough to permit or carry the drag-belt clear of the bottom of the troughs or drag-boxes when not used for carrying corn in either of them, thus greatly lessening the amount of friction. Just before the belt reaches the driving-pulley on its return, at the point U, there is an arrangement of tipping-rollers, V V, for the purpose of tipping the belt and scrapers W W′, arranged as more clearly shown in Fig. 4, for the purpose of discharging the corn from drag-belt into trough or hopper leading to corn-sheller. These scrapers are arranged diagonally across the upper surface of belt, and the scraper W, which is a brush or rubber scraper, is for the purpose of discharging the shelled corn, while the scraper W′, which is made of sheet-iron or other suitable material, is for the purpose of discharging the ear-corn. These tipping-rollers, it will be observed by Figs. 5 and 6, are arranged on different planes, so that one side of the belt passes over one pulley and the other side thereof under the other pulley, thus tipping the belt sufficiently to one side, whereby, with the aid of the scrapers W W', the corn will be discharged therefrom in the hopper leading to sheller, as before described.

The operation of my improvement is as follows: The corn is dumped through floor K into sink-hopper B, and through medium of vibrating shoe C discharged into elevator E, by which it is carried up and discharged onto drag-belt F, and thence carried along in trough or drag-box G, and discharged into the cribs at any point desired through the medium of the switch-bars I.

When it is desired to convey corn from the cribs to sheller, the pulley M, which is provided with a slip-clutch, can be thrown out of engagement with the shaft upon which it is mounted, so that it will turn loosely thereon and permit the elevator E to remain stationary or idle while the corn is being conveyed to sheller by the same drag-belt, in the manner before described.

Although my invention is more especially designed for cribbing and conveying corn, it may be used for other purposes where similar work is to be performed in storing, elevating, and removing grain in store-houses, &c.

Having thus fully described my invention, what I claim as new, and desire to secure by Letters Patent, is—

1. The combination, with one or more storing-cribs, of a trough or drag-box arranged over the same, a drag-belt passing lengthwise through said trough or drag-box, and switch bar or bars adapted to discharge the material being conveyed on said belt into the crib or cribs, substantially as specified.

2. The combination, with one or more storing-cribs, of troughs or drag-boxes arranged over and below said cribs, and an endless drag-belt passing over and under said crib or cribs and lengthwise through said troughs or drag-boxes, for conveying material on said belt to be discharged into said crib or cribs, or removed therefrom, substantially as specified.

3. The combination, with one or more storing-cribs, of a trough or drag-box arranged under the same, a drag-belt passing lengthwise through said trough or box, and tipping-rollers arranged in the path of said belt for tipping the same to one side, to permit the material being carried thereon to be discharged therefrom into a trough or hopper, to be conveyed to a sheller or other suitable place, substantially as specified.

4. The combination, with one or more storing-cribs, of a trough or drag-box arranged under the same, a drag-belt passing lengthwise through said trough or box, and tipping-rollers and scraper or scrapers arranged in the path of said belt for tipping it to one side and discharging the material being carried thereon into a trough or hopper, to be conveyed to a sheller or other suitable place, substantially as specified.

5. The combination, in an elevator-building or store-house, of a sink-hopper, a vibrating feed-shoe, elevating mechanism, one or more storing-cribs having a trough or drag-box arranged over said crib or cribs, a movable drag-belt passing lengthwise through said trough or box, and means for discharging the material elevated and discharged onto said belt into said crib or cribs, substantially as specified.

6. The combination, in an elevator-building or store-house, of a sink-hopper, a vibrating feed-shoe, elevating mechanism, one storing-crib, or more, troughs or drag-boxes arranged over and below said crib or cribs, an endless drag-belt passing over and under said crib or cribs and lengthwise through said troughs or drag-boxes, means for discharging material being carried on said drag-belt into the crib or cribs, and means for tipping and discharging from said belt material being carried from said crib or cribs, substantially as specified.

In testimony that I claim the foregoing I have hereunto set my hand this 22d day of January, 1881.

HENRY KEISER.

Witnesses:
THOS. SLADE,
H. E. HADLEY.